(12) United States Patent  (10) Patent No.: US 8,297,818 B2
Richardson  (45) Date of Patent: Oct. 30, 2012

(54) OPTICAL SYSTEM WITH REFLECTORS AND LIGHT PIPES

(75) Inventor: Brian Edward Richardson, Campbell, CA (US)

(73) Assignee: Rambus International Ltd., Grand Cayman (KY)

( * ) Notice: Subject to any disclaimer, the term of this patent is extended or adjusted under 35 U.S.C. 154(b) by 362 days.

(21) Appl. No.: 12/456,123

(22) Filed: Jun. 11, 2009

(65) Prior Publication Data

US 2010/0220492 A1  Sep. 2, 2010

(51) Int. Cl.
 *F21V 7/04* (2006.01)
(52) U.S. Cl. ............... 362/551; 362/555; 362/311.02; 362/615; 362/623
(58) Field of Classification Search .......... 362/341–361, 362/551, 555, 558, 227, 230, 231, 241, 243, 362/245, 247, 249.02, 296.01, 297, 301, 362/311.01, 311.02, 327, 328, 612, 613, 362/623, 331, 606–607, 615–620
See application file for complete search history.

(56) References Cited

U.S. PATENT DOCUMENTS

| 223,898 | A | 1/1880 | Edison |
| 2,673,923 | A | 3/1954 | Williams |
| 2,971,083 | A | 2/1961 | Phillips et al. |
| 4,172,631 | A | 10/1979 | Yevick |
| 4,392,187 | A | 7/1983 | Bornhorst |
| 4,566,935 | A | 1/1986 | Hornbeck |
| 4,596,992 | A | 6/1986 | Hornbeck |
| 4,615,595 | A | 10/1986 | Hornbeck |
| 4,662,746 | A | 5/1987 | Hornbeck |
| 4,710,732 | A | 12/1987 | Hornbeck |
| 4,956,619 | A | 9/1990 | Hornbeck |
| 4,972,306 | A | 11/1990 | Bornhorst |
| 5,005,108 | A * | 4/1991 | Pristash et al. ............ 362/602 |
| 5,021,928 | A * | 6/1991 | Daniel ..................... 362/556 |
| 5,028,939 | A | 7/1991 | Hornbeck et al. |
| 5,083,252 | A | 1/1992 | McGuire |
| 5,126,886 | A | 6/1992 | Richardson et al. |
| 5,217,285 | A | 6/1993 | Sopori |
| 5,221,987 | A | 6/1993 | Laughlin |
| 5,319,491 | A | 6/1994 | Selbrede |
| 5,396,350 | A | 3/1995 | Beeson |

(Continued)

FOREIGN PATENT DOCUMENTS

EP  814300 A1  12/1997

(Continued)

OTHER PUBLICATIONS

International Search Report and the Written Opinion with mail date of Feb. 18, 2011, re Int'l Application No. PCT/US2010/001673.

(Continued)

*Primary Examiner* — Danielle Allen
(74) *Attorney, Agent, or Firm* — Carr & Ferrell LLP (57) ABSTRACT

An optical system utilizing a light pipe in which light travels by total internal reflection (TIR) accurately controls the light exiting the pipe. The system achieves accurate control of the reflected light by selectively extracting light from a limited area of the light pipe. The configuration of the reflectors used for the selective extraction of the light determines the nature of the output light. The reflectors are preferably located on an output side of the light pipe. All light output by the system is directed by the reflectors.

18 Claims, 12 Drawing Sheets

U.S. PATENT DOCUMENTS

| | | | |
|---|---|---|---|
| 5,467,208 | A | 11/1995 | Kokawa et al. |
| 5,631,895 | A | 5/1997 | Okada et al. |
| 5,825,548 | A | 10/1998 | Bornhorst et al. |
| 5,936,772 | A | 8/1999 | Suzuki |
| 5,953,469 | A | 9/1999 | Zhou |
| 5,995,690 | A * | 11/1999 | Kotz et al. ............... 385/25 |
| 6,031,958 | A * | 2/2000 | McGaffigan ............ 385/146 |
| 6,040,937 | A | 3/2000 | Miles |
| 6,048,081 | A | 4/2000 | Richardson |
| 6,347,874 | B1 * | 2/2002 | Boyd et al. ................ 362/628 |
| 6,350,041 | B1 | 2/2002 | Tarsa |
| 6,360,033 | B1 | 3/2002 | Lee et al. |
| 6,379,016 | B1 * | 4/2002 | Boyd et al. ................ 362/625 |
| 6,421,103 | B2 | 7/2002 | Yamaguchi |
| 6,421,104 | B1 | 7/2002 | Richard |
| 6,438,283 | B1 | 8/2002 | Karaguleff et al. |
| 6,502,961 | B1 | 1/2003 | Richardson |
| 6,550,942 | B1 * | 4/2003 | Zou et al. ................ 362/347 |
| 6,565,233 | B1 | 5/2003 | Richardson |
| 6,612,729 | B1 * | 9/2003 | Hoffman ................ 362/551 |
| 6,674,562 | B1 | 1/2004 | Miles |
| 6,729,734 | B2 | 5/2004 | Childers et al. |
| 6,768,572 | B2 | 7/2004 | Romanovsky |
| 6,771,325 | B1 | 8/2004 | Dewald et al. |
| 6,824,270 | B2 | 11/2004 | Kim et al. |
| 6,867,896 | B2 | 3/2005 | Miles |
| 6,924,945 | B1 | 8/2005 | Richardson |
| 6,974,232 | B1 | 12/2005 | Richardson |
| 7,080,932 | B2 | 7/2006 | Keuper |
| 7,123,216 | B1 | 10/2006 | Miles |
| 7,142,744 | B2 | 11/2006 | Walter et al. |
| 7,144,131 | B2 | 12/2006 | Rains |
| 7,177,498 | B2 | 2/2007 | Cizek |
| 7,286,296 | B2 | 10/2007 | Chaves et al. |
| 7,330,632 | B1 * | 2/2008 | Buelow et al. ............ 385/146 |
| 7,345,824 | B2 | 3/2008 | Lubart |
| 7,380,962 | B2 | 6/2008 | Chaves et al. |
| 7,400,805 | B2 * | 7/2008 | Abu-Ageel ............... 385/120 |
| 7,447,397 | B1 | 11/2008 | Maki et al. |
| 7,499,206 | B1 | 3/2009 | Richardson |
| 7,661,862 | B2 * | 2/2010 | Lee et al. ............... 362/559 |
| 7,780,330 | B2 * | 8/2010 | Aylward et al. ............ 362/613 |
| 2002/0031294 | A1 | 3/2002 | Takeda et al. |
| 2002/0044720 | A1 | 4/2002 | Brophy et al. |
| 2002/0105709 | A1 | 8/2002 | Whitehead et al. |
| 2003/0147232 | A1 * | 8/2003 | Kraft ..................... 362/31 |
| 2004/0076396 | A1 | 4/2004 | Suga |
| 2004/0109105 | A1 | 6/2004 | Nagakubo |
| 2004/0218390 | A1 * | 11/2004 | Holman et al. ............ 362/245 |
| 2005/0018147 | A1 | 1/2005 | Lee et al. |
| 2005/0057731 | A1 | 3/2005 | Lee et al. |
| 2005/0221473 | A1 | 10/2005 | Dubin et al. |
| 2005/0243570 | A1 | 11/2005 | Chaves |
| 2005/0248427 | A1 | 11/2005 | Starkweather et al. |
| 2005/0270796 | A1 | 12/2005 | Ichikawa |
| 2006/0070379 | A1 | 4/2006 | Starkweather et al. |
| 2007/0133224 | A1 | 6/2007 | Parker |
| 2007/0176887 | A1 | 8/2007 | Uehara |
| 2007/0211487 | A1 | 9/2007 | Sormani |
| 2008/0170296 | A1 | 7/2008 | Chaves et al. |
| 2008/0247169 | A1 | 10/2008 | Zou |
| 2008/0278460 | A1 * | 11/2008 | Arnett et al. .............. 345/175 |
| 2009/0064993 | A1 | 3/2009 | Ghosh |
| 2009/0116099 | A1 | 5/2009 | Richardson |
| 2009/0262368 | A1 | 10/2009 | Leong |
| 2010/0085773 | A1 | 4/2010 | Richardson |
| 2010/0172138 | A1 | 7/2010 | Richardson |
| 2010/0220492 | A1 | 9/2010 | Richardson |
| 2010/0315802 | A1 | 12/2010 | Richardson |
| 2010/0315836 | A1 | 12/2010 | Richardson |
| 2010/0328748 | A1 | 12/2010 | Richardson |

FOREIGN PATENT DOCUMENTS

| | | | |
|---|---|---|---|
| EP | 867747 | A2 | 9/1998 |
| EP | 0969305 | A1 | 1/2000 |
| EP | 0969306 | A1 | 1/2000 |
| EP | 1215526 | A1 | 6/2002 |
| EP | 1291833 | A2 | 3/2003 |
| EP | 2045633 | A1 | 4/2009 |
| GB | 663840 | A | 12/1951 |
| JP | 02002229017 | A | 8/2002 |
| WO | 2004068183 | A2 | 8/2004 |
| WO | 2008060335 | A1 | 5/2008 |
| WO | 2009024952 | A2 | 2/2009 |

OTHER PUBLICATIONS

Information Disclosure Statement with mail date of Mar. 25, 2010, re U.S. Appl. No. 12/319,171.
Information Disclosure Statement with mail date of Sep. 8, 2010, re U.S. Appl. No. 12/319,171.
International Search Report and the Written Opinion with mail date of Mar. 4, 2011, re Int'l Application No. PCT/US2010/001674.
Statement of Special Status in Support of Petition to Make Special under the Green Technology Pilot Program with mail date of Dec. 22, 2009, re U.S. Appl. No. 12/319,172.
Decision of Petition to Make Special under the Green Technology Pilot Program (Dismissed) with mail date of Feb. 22, 2010, re U.S. Appl. No. 12/319,172.
Information Disclosure Statement with mail date of Mar. 24, 2010, re U.S. Appl. No. 12/319,172.
Preliminary Amendment with mail date of Apr. 12, 2010, re U.S. Appl. No. 12/319,172.
Renewed Petition for Green Tech Pilot Program with mail date of Jun. 10, 2010, re U.S. Appl. No. 12/319,172.
Decision of Petition to Make Special under the Green Technology Pilot Program (Dismissed) with mail date of Jul. 13, 2010, re U.S. Appl. No. 12/319,172.
Preliminary Amendment with mail date of Aug. 13, 2010, re U.S. Appl. No. 12/319,172.
Renewed Petition for Green Tech Pilot Program with mail date of Aug. 13, 2010, re U.S. Appl. No. 12/319,172.
Decision on Petition to Make Special under the Green Technology Program (Denied) with mail date of Aug. 27, 2010, re U.S. Appl. No. 12/319,172.
Renewed Petition for Green Technology Pilot Program with mail date of Sep. 7, 2010, re U.S. Appl. No. 12/319,172.
Preliminary Amendment with mail date of Sep. 7, 2010, re U.S. Appl. No. 12/319,172.
Information Disclosure Statement with a mail date of Sep. 8, 2010, re U.S. Appl. No. 12/319,172.
Decision on Petition to Make Special under the Green Technology Program (Denied) with mail date of Oct. 14, 2010, re U.S. Appl. No. 12/319,172.
Non-Final Office Action with mail date of Oct. 21, 2010, re U.S. Appl. No. 12/319,172.
Statement of Special Status in Support of Petition to Make Special under the Green Technology Pilot Program with mail date of Oct. 22, 2010, re U.S. Appl. No. 12/319,172.
Response to Office Action of Oct. 21, 2010 with mail date of Mar. 21, 2011, re U.S. Appl. No. 12/319,172.
International Search Report and the Written Opinion with mail date of Feb. 7, 2011, re Int'l Application No. PCT/US2010/001661.
International Search Report and the Written Opinion with mail date of Sep. 13, 2010, re Int'l. Application No. PCT/US2009/006763.

* cited by examiner

OPTICAL SYSTEM WITH REFLECTORS AND LIGHT PIPES

FIELD OF THE INVENTION

The present invention relates generally to light collection devices, and more particularly is a light pipe optical system that collects light from a light source and distributes the light over a large area, while precisely controlling the angle and distribution of the illuminant within the output light beam. The unique optical system allows the device to be manufactured in extremely thin packages.

BACKGROUND OF THE INVENTION

Many products require an optical system that is capable of spreading light over a large area and controlling the direction of the light as it exits the system. Recent improvements in the performance of LEDs, coupled with a concurrent reduction in the cost of their production, have made LEDs a more viable option for many applications. However, many applications such as LCD backlights, signs with backlights, overhead lighting, and automotive lighting require the concentrated light that is generated by an LED to be spread over a large area, while still controlling the direction of the light. These applications would benefit from an improved optic system to provide the desired light control.

A historic advancement in controlling light output from energy saving lighting fixtures was made by Donald Phillips, et al, for the "Low Brightness Louver" disclosed in U.S. Pat. No. 2,971,083, issued Feb. 7, 1961. This invention allowed for the practical use of fluorescent light fixtures in workplaces. The Phillips device provided a cost-effective implementation of fluorescent lamps that produced a light output distribution that was acceptable for the office environment. The utilization of the Phillips louver has saved an incredible amount of energy over the years. However, with the mass implementation of fluorescent fixtures came mass consumption of fluorescent lamps. Disposal of expended fluorescent lamps has become a big environmental problem due to the fact that mercury is required for use in the fluorescent tubes, and disposal of mercury has a large environmental impact. The environmental issue and other disadvantages inherent to fluorescent lighting have led to the prospective development of LEDs as an alternative lighting source.

The backlighting for LCD devices is an area in which compact optic systems have seen significant developments which are being extended to other lighting systems. Three groups of prior art references have addressed the control of light in LCD type displays. Among these, prism type brightness enhancing films (BEFs) comprise the most common class. One example of a BEF device is U.S. Pat. No. 5,467, 208, "Liquid Crystal Display" by Shozo Kokawa, et al., issued Nov. 14, 1995. This reference discusses the prior art of prism type films and discloses improvements to the art. One drawback to prism films is that they have only limited control of the angle of the light output. Further, changes to the prism features result in only slight variations in the light output. The prism films are also limited to an essentially two dimensional structure. If an application requires control of the light in two directions, two BEFs must be deployed.

A second class of prior art is exemplified by U.S. Pat. No. 6,421,103, "Liquid Crystal Display Apparatus . . . " by Akira Yamaguchi, issued Jul. 16, 2002. The Yamaguchi reference discloses another device to control light as it enters an LCD panel. The patent discloses light sources, a substrate (not used as a light pipe), apertures, and reflective regions on the substrate. Light directed to the substrate is either reflected by the reflective surface or passed through the apertures. The light that passes through the apertures is then captured by a lens that is used to control the direction of the output light. Yamaguchi teaches restriction of the angle of the output light to concentrate more light directly at the viewer of an LCD type display. The Yamaguchi device provides much greater control of the output light than can be had with a BEF device. But a drawback to the Yamaguchi device is that it is extremely inefficient. Light is reflected off of the reflective surface many times before it passes through an aperture. Even when the reflective surface is made with a high reflectance material, the losses in intensity are substantial. Therefore while the control of light with a Yamaguchi type device is superior to that of BEF devices, the efficiency of the device is very low.

U.S. Pat. No. 5,396,350, "Backlighting Apparatus . . . " by Karl Beeson, issued Mar. 7, 1995; and U.S. Pat. No. 7,345, 824, Light Collimating Device" by Neil Lubart, issued Mar. 18, 2008; disclose devices in the third class of prior art light control optics for LED light source devices. The Beeson and Lubart references disclose a reflective structure on the viewer side of the light pipe. The range of control of these reflective structures is limited, and the control is not equivalent to that provided by devices such as Yamaguchi. Further, the reflective structures of the Beeson, Lubart type devices are positioned very close to the LCD panel. The close positioning allows any defects in the output of the reflective structures to be easily seen by the viewer of the display.

Figure 1:
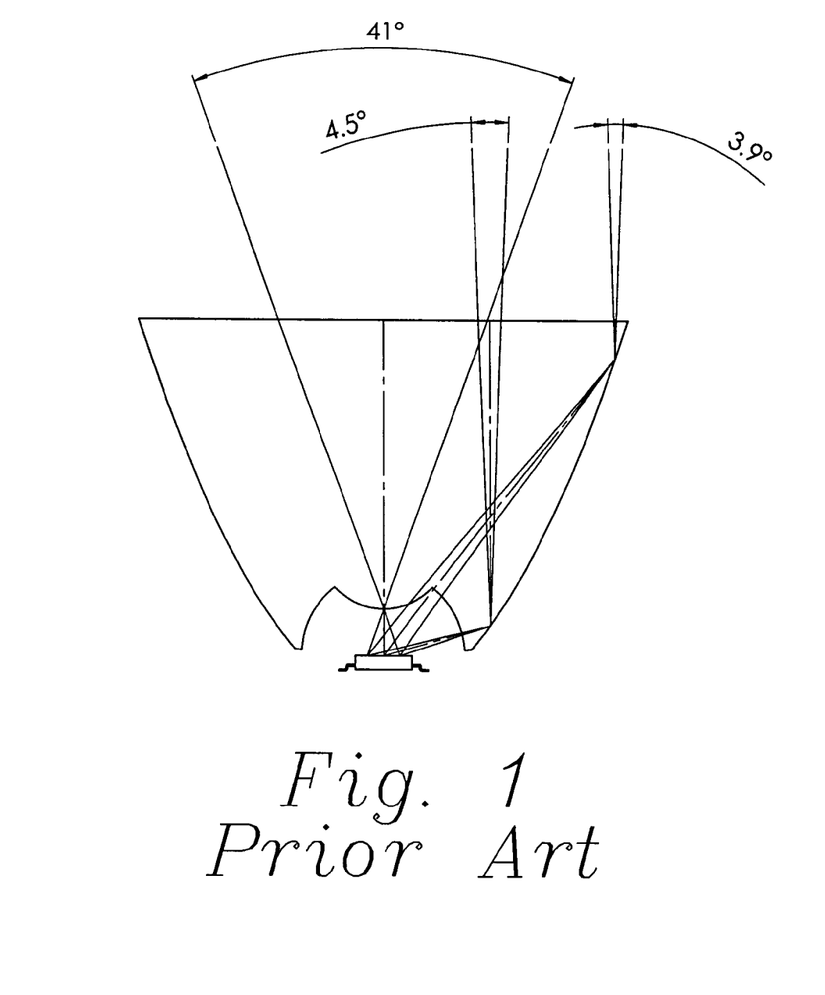
FIG. 1 is a side view of a typical prior art reflector system.

Still another method of collection and control of light from LEDs is accomplished with the use of a conventional reflector and refractive optics in combination. A typical example of this type of system, currently state of the art, is shown in FIG. 1. Although this type of system is effective in collecting all of the light from the LED, the ability to control the output is limited. The light that is collected by the reflector portion of the system has a generally uniform cone angle as it leaves the reflector. In this example the cone angle ranges from 3.9 degrees to 4.5 degrees. The refractive optics (i.e. the light transmitted through the lens) has a much greater cone angle, 41 degrees. Therefore if a particular application requires a cone angle of less than 41 degrees, this system cannot be used.

Another drawback inherent to the system of FIG. 1 is due to the fact that the output light comes from two sources, a lens and a reflector. The nature of the light from the lens is quite different than that from the reflector. It is therefore very difficult to optimize the output from both sources simultaneously. Measures that have a positive effect on the light output from the lens tend to have a negative effect on the light output from the reflector, and vice versa.

Accordingly, it is an object of the present invention to provide an optical system that is extremely efficient and also provides excellent control of the output light, all of the output light coming from a single type of source within the system.

It is another object of the present invention to provide a less complex optical system than is used in current art systems, thereby reducing the cost to manufacture the device.

It is another object of the present invention to have accurate control of the output beam angle and the distribution of the illuminant within the beam.

It is a further object of the present invention to provide a light pipe that will provide accurate control of the direction of light output.

SUMMARY OF THE INVENTION

The present invention is an optic system for a light pipe that very accurately controls the angle of the light as it exits the system. The system can be used in many applications, ranging from LCDs to overhead lighting. The LCD displays most suitable for the system are those used in cellular phones, laptop computers, computer monitors, TVs, and commercial displays. The system extracts light from the light pipe at discrete points. Using the extraction elements in combination with a reflector, the output light of the device can be controlled to be parallel, divergent or convergent. The reflectors used in the system can be two dimensional or three dimensional. All of the light output from the system emanates from the reflectors of the system.

An advantage of the optic system and light pipe of the present invention is that the system accurately controls the angles of the output light, having all the output light emanating from the reflectors.

Another advantage of the optic system of the present invention is that it transmits light more efficiently than prior art devices.

Another advantage of the present invention is that a device that distributes light over a large area can still be contained in a very thin package.

Yet another advantage of optic system of the present invention is that it is simple in construction, and therefore easy and economical to manufacture.

These and other objectives and advantages of the present invention will become apparent to those skilled in the art in view of the description of the best presently known mode of carrying out the invention as described herein and as illustrated in the drawings.

DETAILED DESCRIPTION OF THE INVENTION

Figure 2:
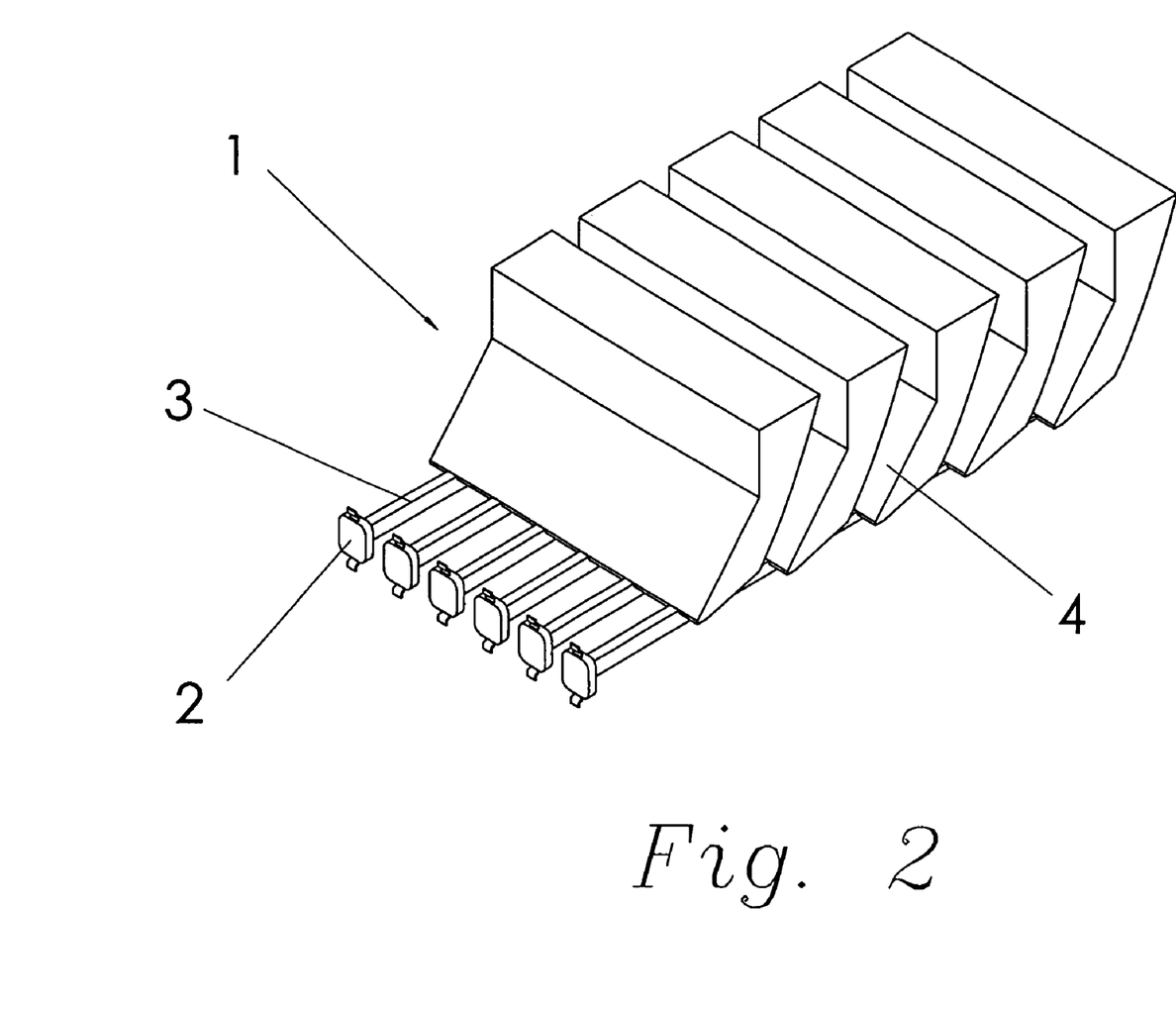
FIG. 2 is a prospective view of the system of the present invention.

Referring first chiefly to FIG. 2, the optical system 1 of the present invention comprises a plurality of LEDs 2 situated at a first end 5 of a plurality of light pipes 3. It should be noted that more than one LED 2 could be associated with each light pipe 3. It should also be noted that the drawing is not to scale. The LED 2 would be much smaller, or the light pipe 3 could be wider, than depicted in the drawings.

Figure 2B:
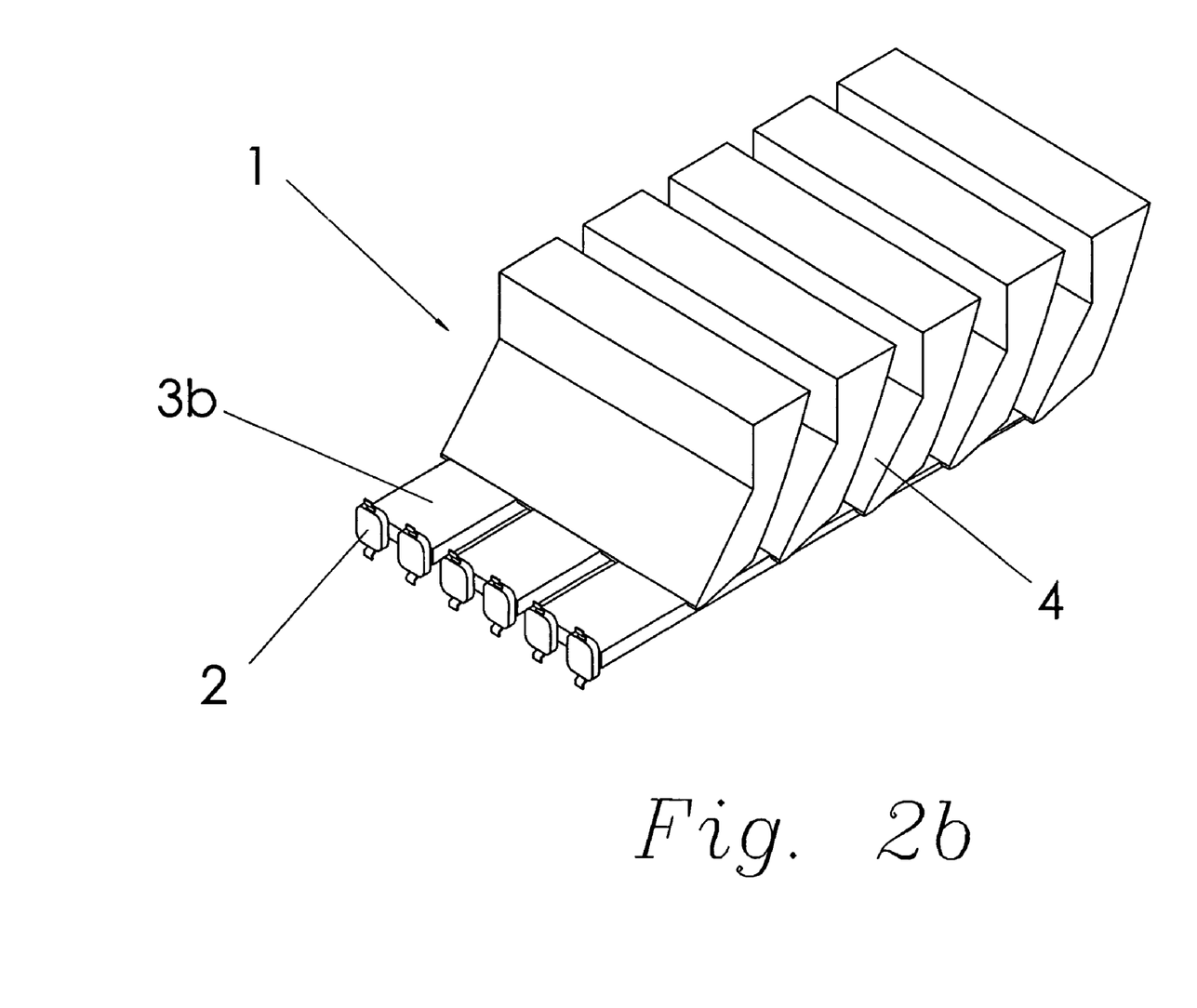
FIG. 2b is a prospective view of the system of the present invention with multiple LEDs associated with each light pipe.

For some applications, such as when the desired output of the system 1 is the projection of differing colors, multiple LEDs 2 are employed on each light pipe 3 as illustrated in FIG. 2B. At least one sensor is positioned so as to monitor the light pipes 3 to determine the actual color or colors being produced by the LEDs 2. Controlling electronics monitor the output from the sensors and drive the LEDs 2 to control the color of the output light as desired for the application. DMX is one industry standard protocol that can be used to drive the controlling electronics in lighting fixture systems. One skilled in the art of LED driver electronics could devise many different circuits to accomplish the controlling task.

The preferred embodiment of the optical system 1 illustrated in FIG. 2 shows a total of six LEDs 2 generally equally spaced at the first ends 5 of the six light pipes 3. It should be recognized that the number, size, and spacing of the LEDs 2 and the light pipes 3 would be a function of the particular application of the system.

The optical system 1 further comprises a plurality of reflectors 4. Typically, the number of reflectors 4 and the width of the reflectors 4 would be much greater than shown in FIG. 2. The preferred embodiment of the optical system 1 has a thickness that is much less than the length and width of the system. The reflectors 4 have been shown with reduced size and number for clarity of illustration.

Figure 3:
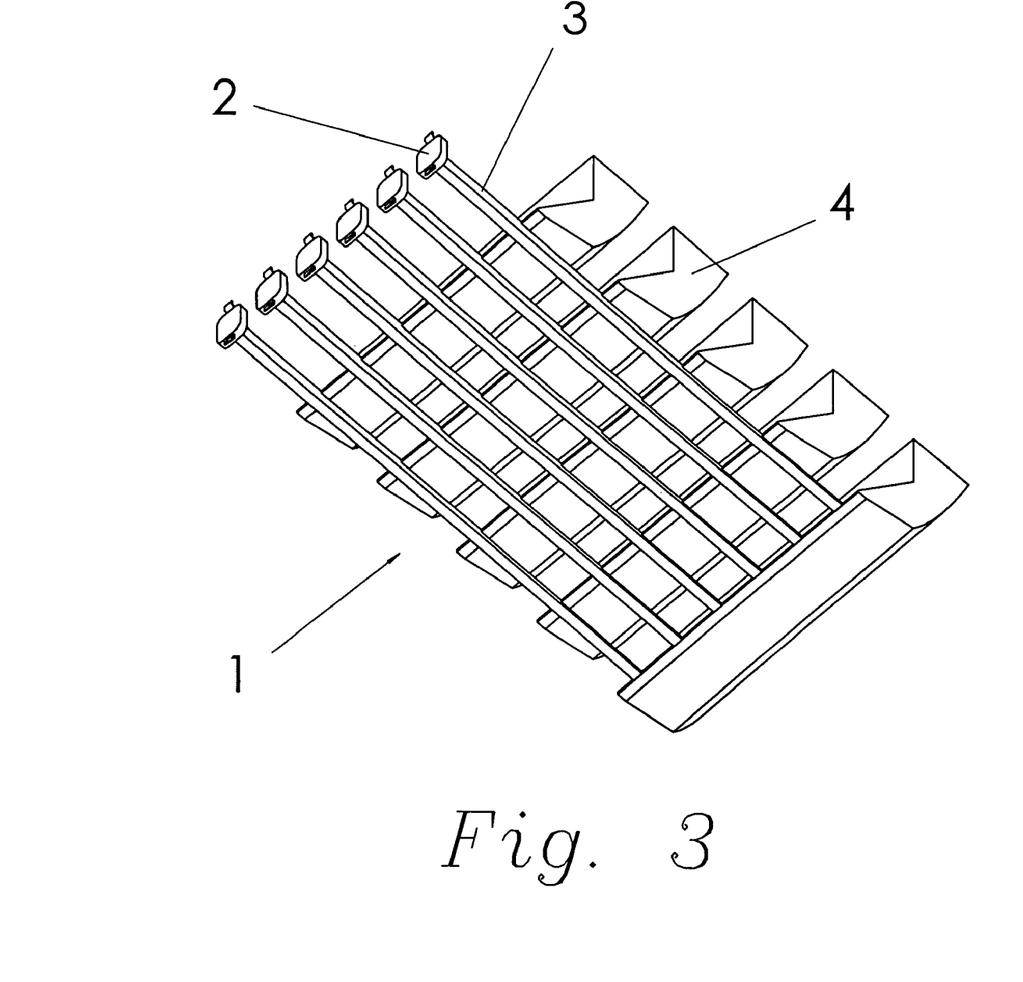
FIG. 3 is an underside prospective view of the system.
Figure 4:
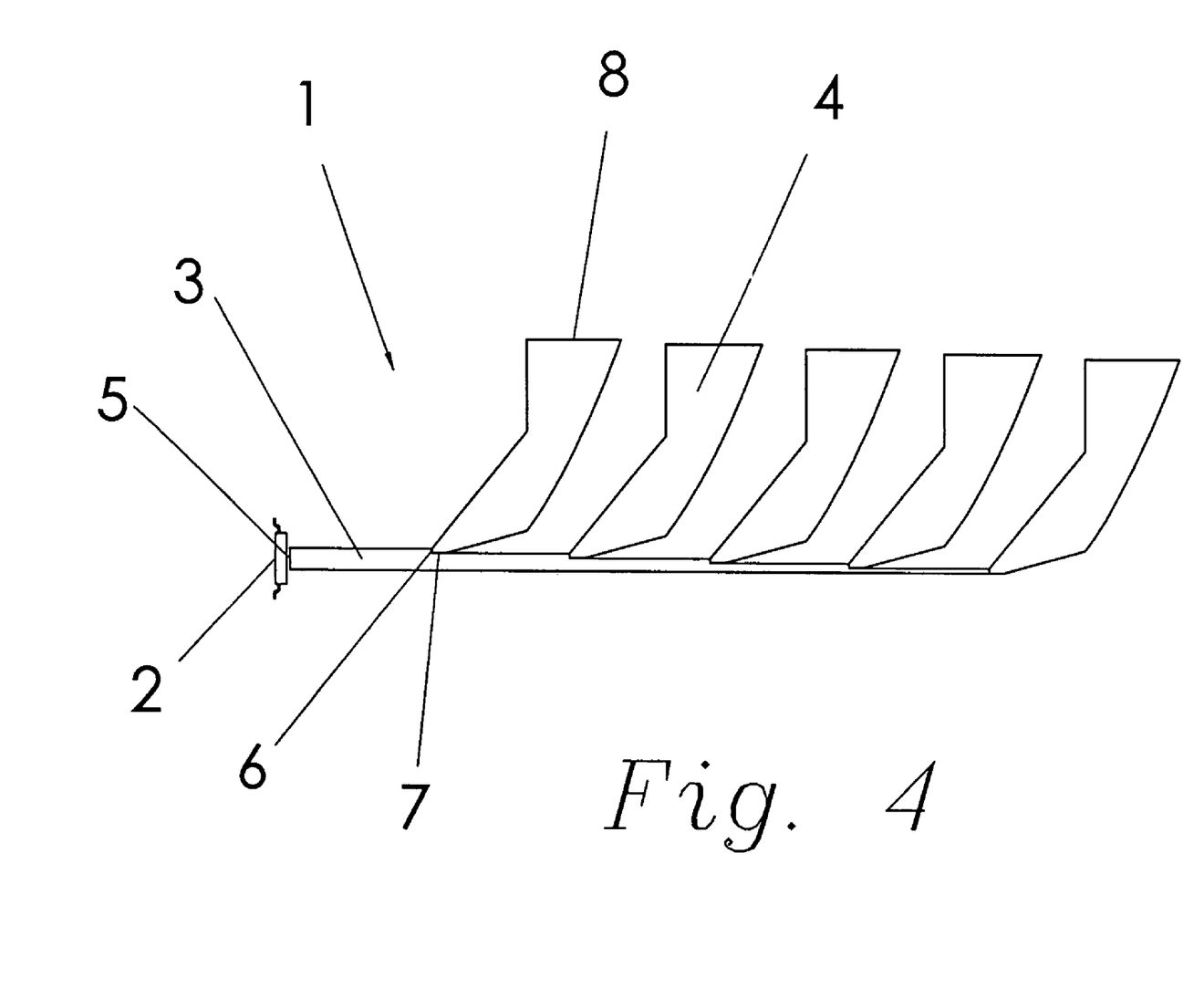
FIG. 4 is a side view of the system of the present invention.

The connections of the light pipes 3 to the reflectors 4 can best be seen in FIGS. 3 and 4, an underside perspective and side view respectively, of the optical system 1. Light emitted from the LEDs 2 enters the light pipe 3 at the first end 5 of the light pipe 3. The light travels down the light pipe 3 via TIR until it enters one of the reflectors 4. Light may enter the reflector 4 at either a front edge 6 or a lower edge 7. The path that the light takes from the first end 5 of the light pipe 3 to the reflector 4 is shown in greater detail in FIG. 5.

Figure 5:
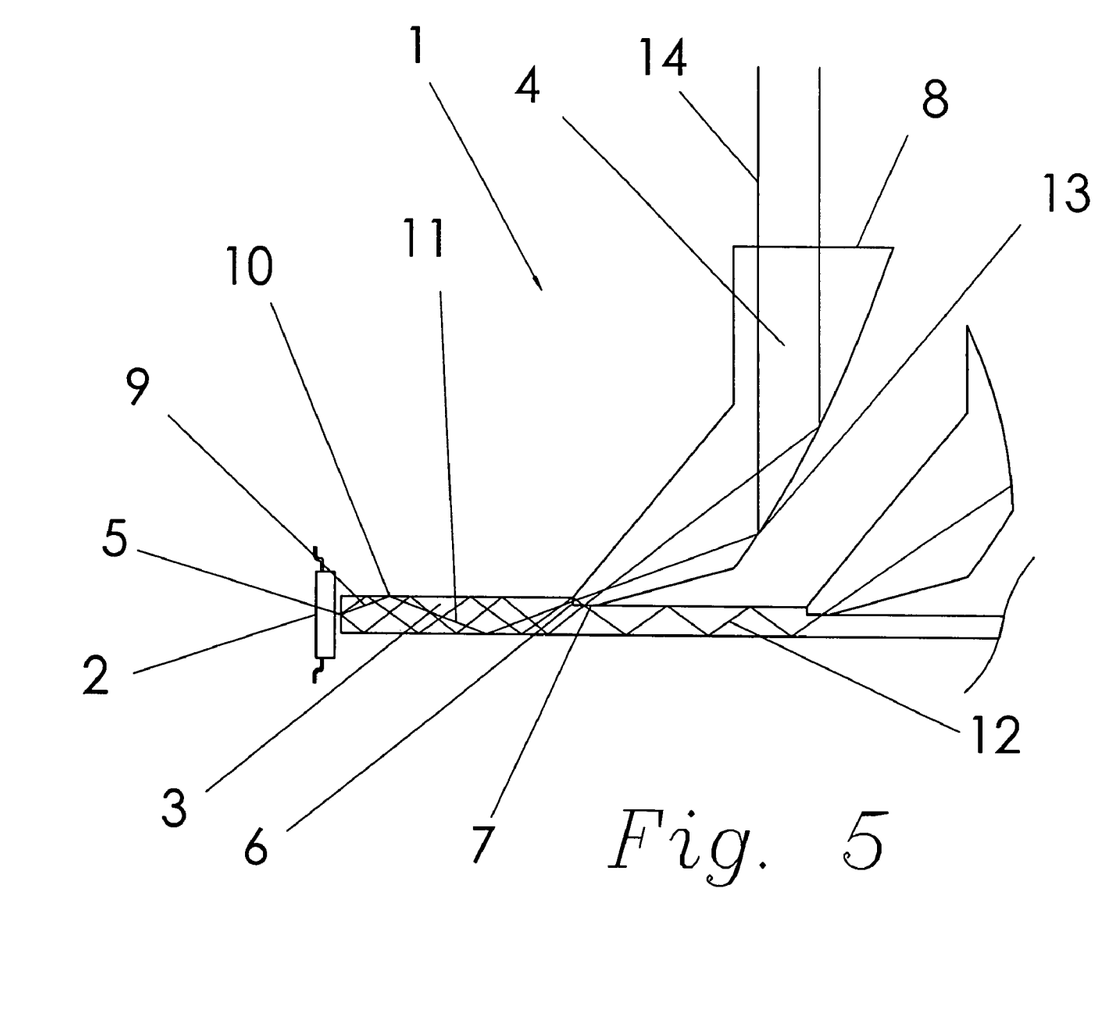
FIG. 5 is a detailed broken side view of the system with traces of light rays shown.
Figure 5B:
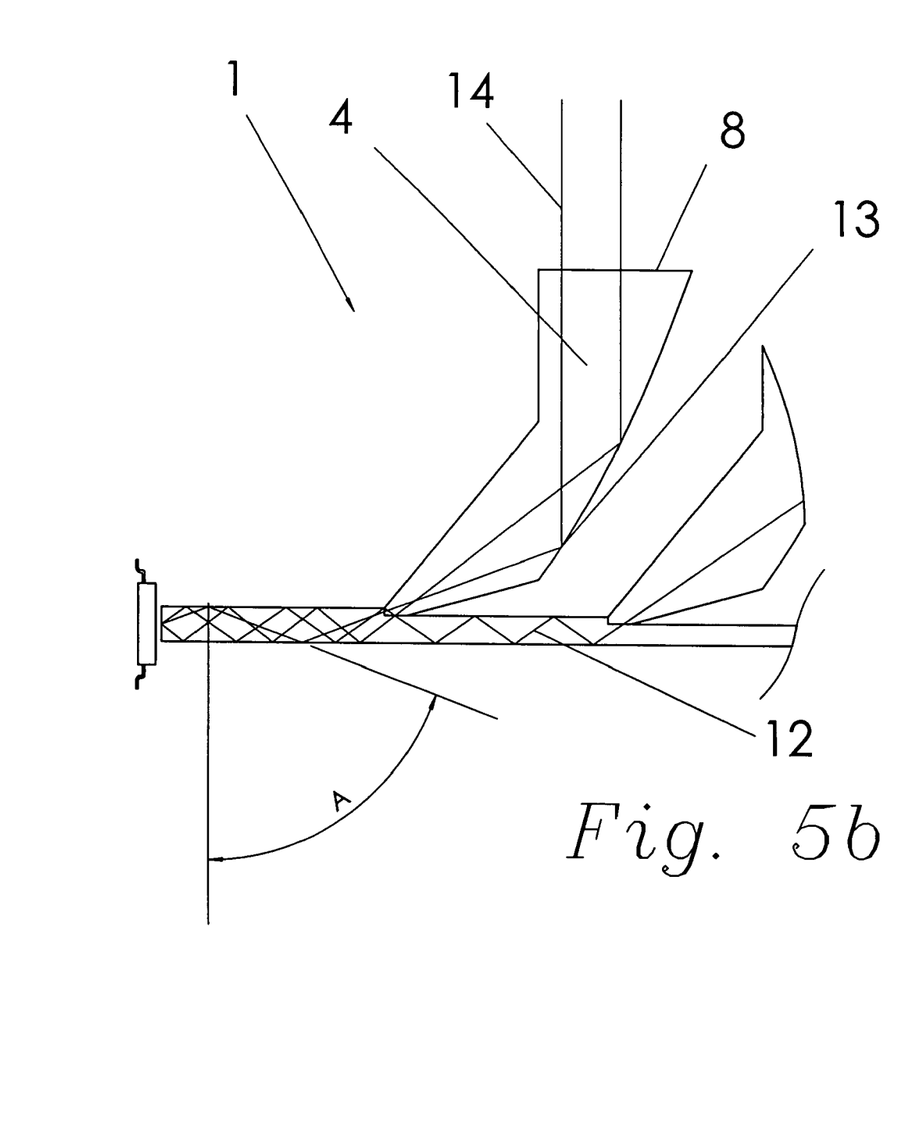
FIG. 5b is the broken side view with traces of light rays shown with angle A being defined.

Light from the LED 2 enters the first end 5 of the light pipe 3. An upper light ray 9 travels from the first end 5 of the light pipe 3 and strikes an upper surface 10 of the light pipe 3. When the contact angle of light ray 9 with a surface of the light pipe 3 is sufficiently shallow, the light reflects (via total internal reflection (TIR)) off of the surface of the light pipe 3. This reflection is governed by the equation:

$$A = \arcsin(Ns/Nlg)$$

Where A is the angle (illustrated in FIG. 5b) from normal to the surface of the light pipe, Nlg is the index of refraction of the light pipe, And Ns is the index of refraction of the medium outside the light pipe.

For air or another low index material, Ns would be 1.35 or less. For a plastic or glass light pipe 3, Nlg might be 1.5. Angle A for these values is 64°. In some instances, a user might coat the outside surface of the light pipe with a material with a low index of refraction, n=1.35 for example, to protect the light pipe from the adverse effects of dirt or fingerprints. This is often done in TIR applications such as fiber optic cables.

If light strikes the surface of the light pipe 3 at an angle from normal greater than A, light will reflect off of the surface, in total internal reflection (TIR). If the angle from normal is less than A, light will pass through the upper light pipe surface 10 and be refracted. The optical system 1 is constructed, through materials and geometry selections, so that as large a percentage as is possible of the light emitted from the LEDs 2 TIRs within the light pipe 3.

Reflected light ray 11 continues to TIR along the light pipe 3 until it encounters either a front edge 6 or a lower edge 7 of one of the reflectors 4. Each reflector 4 has preferably the same or greater an index of refraction than the light pipe 3. If the indexes of the light pipe 3 and the reflector 4 are the same, the reflected light ray 11 continues to travel in the same direction. If the indexes of refraction are slightly different, the reflected light 11 is refracted. If the indexes are much different, and the reflector 4 has a lessor index of refraction, light may again TIR. For most applications, it is undesirable to have any light TIR in the area where the reflector 4 makes contact with the light pipe 3. Therefore selecting a reflector 4 with an index of refraction greater than that of the light pipe 3 to ensure complete passage of the light is desirable.

The size and proportions of the front edge 6 and the lower edge 7 of the reflector 4 are a function of the desired output for a particular application. The ideal relation of these dimensions is a function of the desired output of the system, the number of reflectors that are attached to the light pipe, the geometry of the reflectors, and the geometry of the light pipe itself. One skilled in the art would be able to select the appropriate dimensions for the reflectors once given the relevant characteristics of the system and the desired output.

It should be noted that each reflector 4 is installed in a notch in the light pipe 3 so that the top of the front edge 6 of the reflector 4 is flush with the upper surface of the light pipe 3. Each successive reflector 4 is similarly installed in a notch so that the light pipe 3 is reduced in thickness from the first end 5 to the distal end of the light pipe 3. The reduction in thickness of the light pipe 3 chokes down the light ray travel paths to facilitate extraction of the light from the light pipe 3.

As the reflected light rays 11 travel through the light pipe 3, the rays 11 eventually enter one of the reflectors 4, where the rays 11 are directed from the front and lower edges 6, 7 to rear surfaces 13. The angle of incidence of the rays 11 with surfaces 13 is sufficiently shallow that the resultant reflections are also TIRs. This is desirable, in that TIR reflects a much higher percentage of light than can be obtained with a metallic, or any other type of, reflective coating. Furthermore, utilizing TIR for the output does not require any additional manufacturing steps that would increase the cost of the system.

The TIR reflected ray 14 reflects with generally the same characteristics as the reflective portion of the prior art shown in FIG. 1. Specifically the magnification does not change significantly as light hits any of the positions along the reflector 4. In the prior art, due to the disparity of the two light directors, the lens and the reflector, the angle that the light deviates from normal can range from 3.9 to 41 degrees. One of the key advantages of the present invention is that the entire output of the system is from the reflectors 4. This enables the system to provide extremely accurate control of the output. The shape of the reflectors 4 is shown as a parabolic. The parabolic shape directs the light in generally a parallel path. Other shapes could be used to create different beam directions and beam widths. The particular application in which the system is to be used determines the specific shape of the reflectors.

Figure 6:
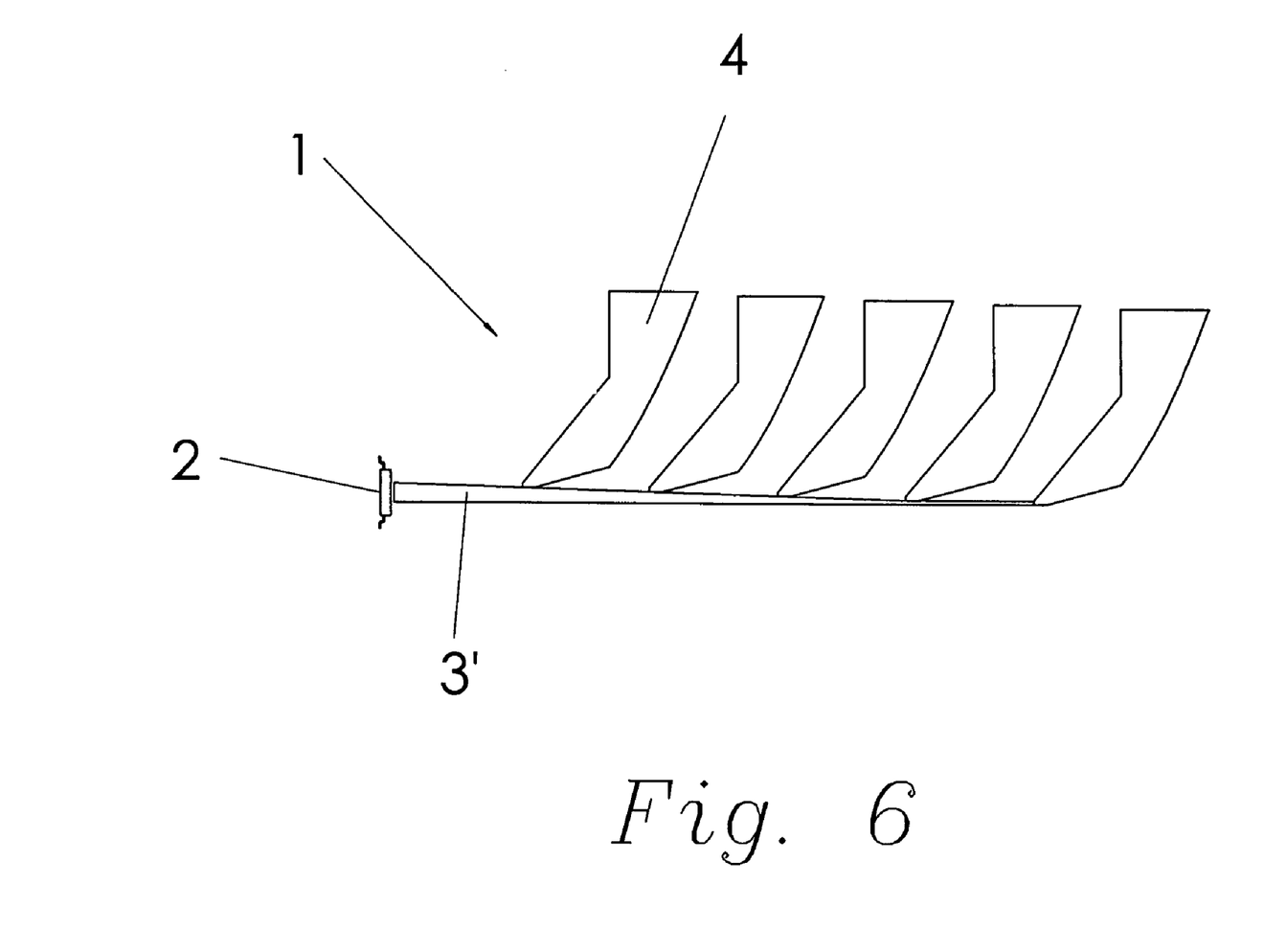
FIG. 6 shows the system with a tapered light pipe.
Figure 7:
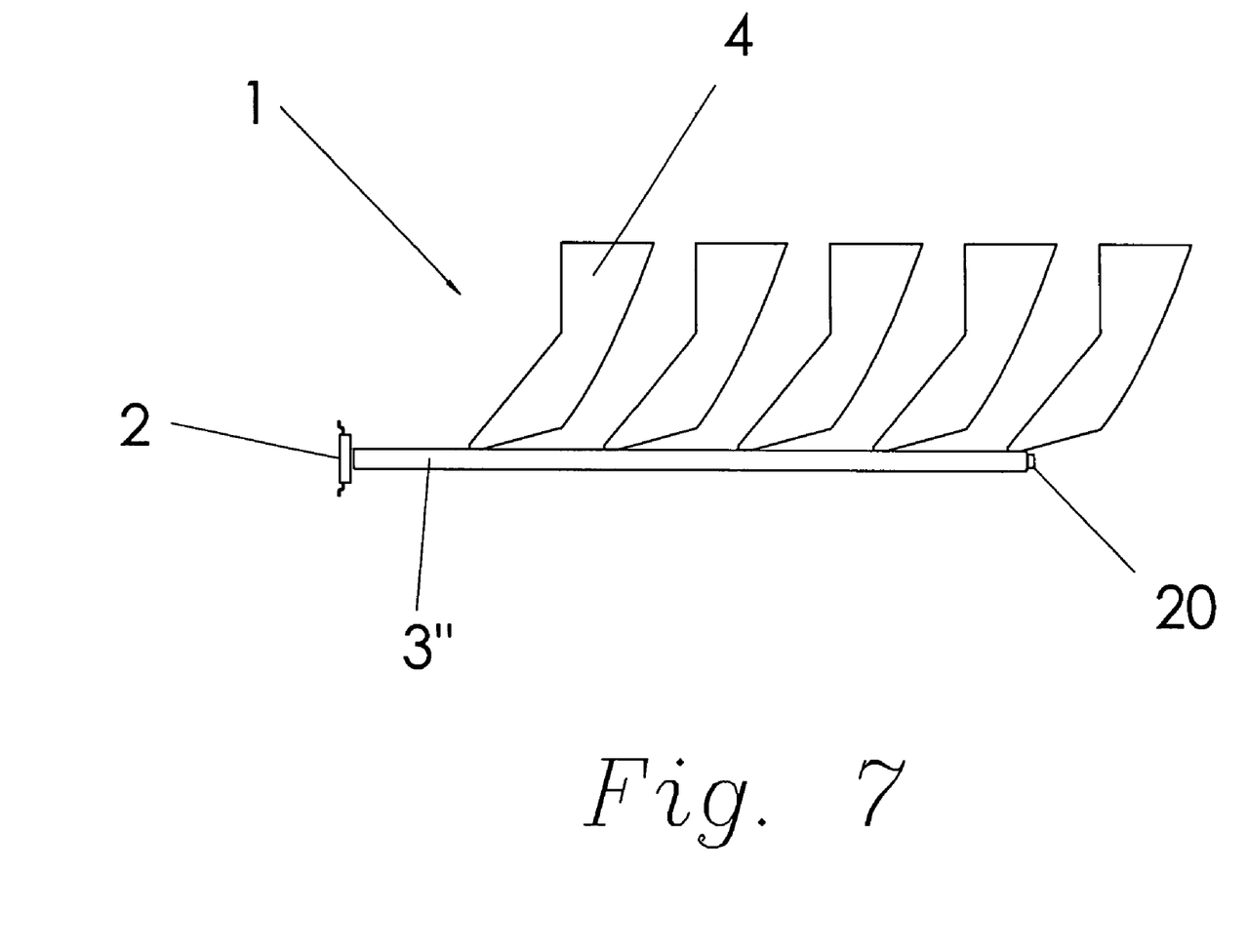
FIG. 7 illustrates the system with a constant thickness light pipe.

FIG. 6 illustrates another method in which the thickness of the light pipe can be reduced. FIG. 6 shows the light pipe 3' to taper in a gradual manner from the first end 5. The taper is depicted as being linear, but the taper could also be a shallow curved shape. The specific shape of the light pipe 3' is engineered for the particular application of the system. In some cases, the light pipe of the system may have a constant thickness as illustrated in FIG. 7. A light pipe 3" with constant thickness can be ideal when an optical sensor 20 is to be deployed in conjunction with controlling electronics.

Figure 8:
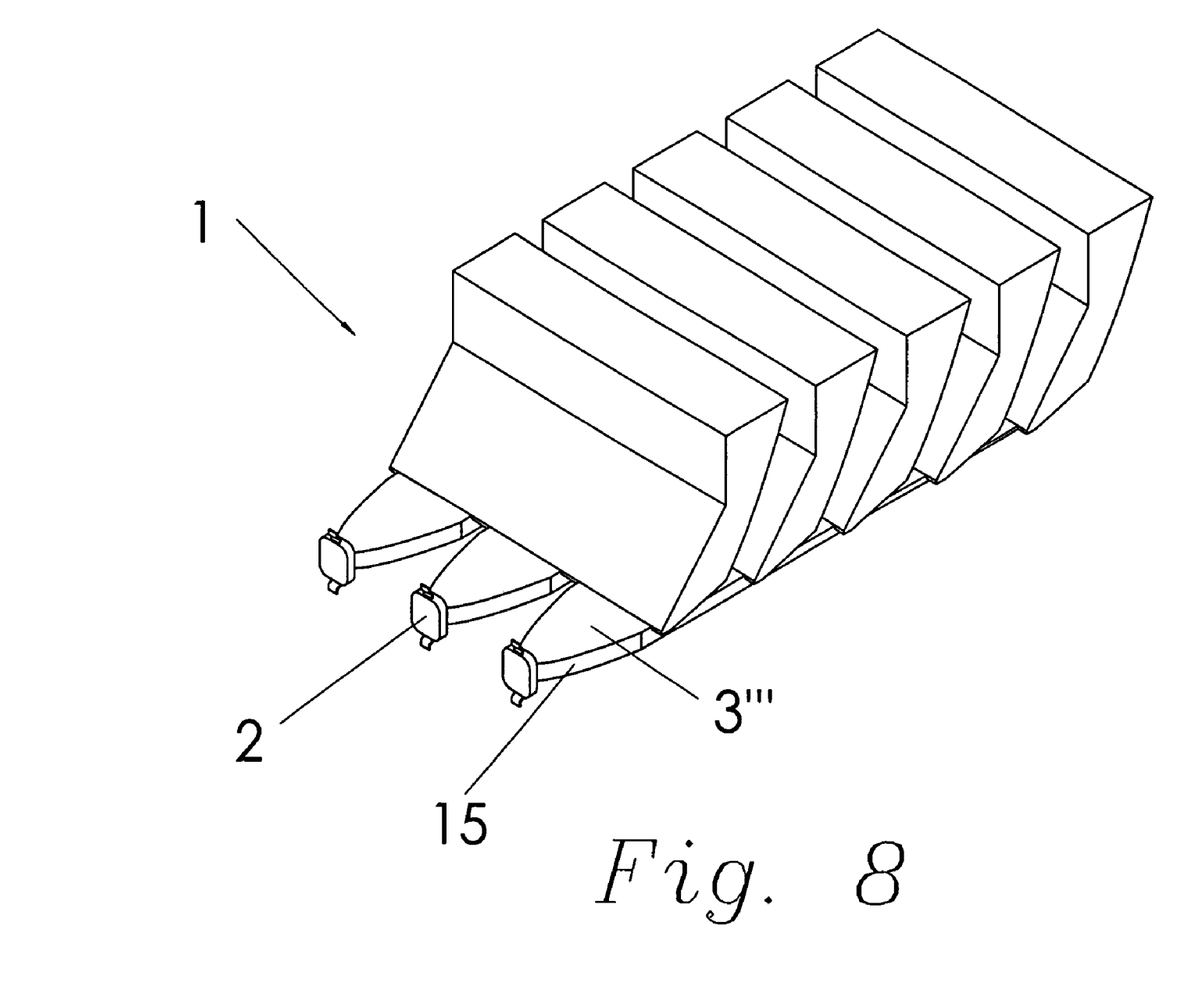
FIG. 8 shows the system with curved directing means to control the light path within the system.

FIG. 8 illustrates another modification that can be used to control the direction of travel of light within a light pipe 3'''. Light pipe 3''' has a curved or angled first end 15. The reverse taper is shown in the transverse direction, but could also be utilized in the vertical direction, or both transverse and vertical. The reverse tapered first end 15 directs a greater percentage of the light rays from LED 2 into the light pipe 3''' in a direction parallel to the longitudinal axis of the light pipe 3'''.

Figure 9:
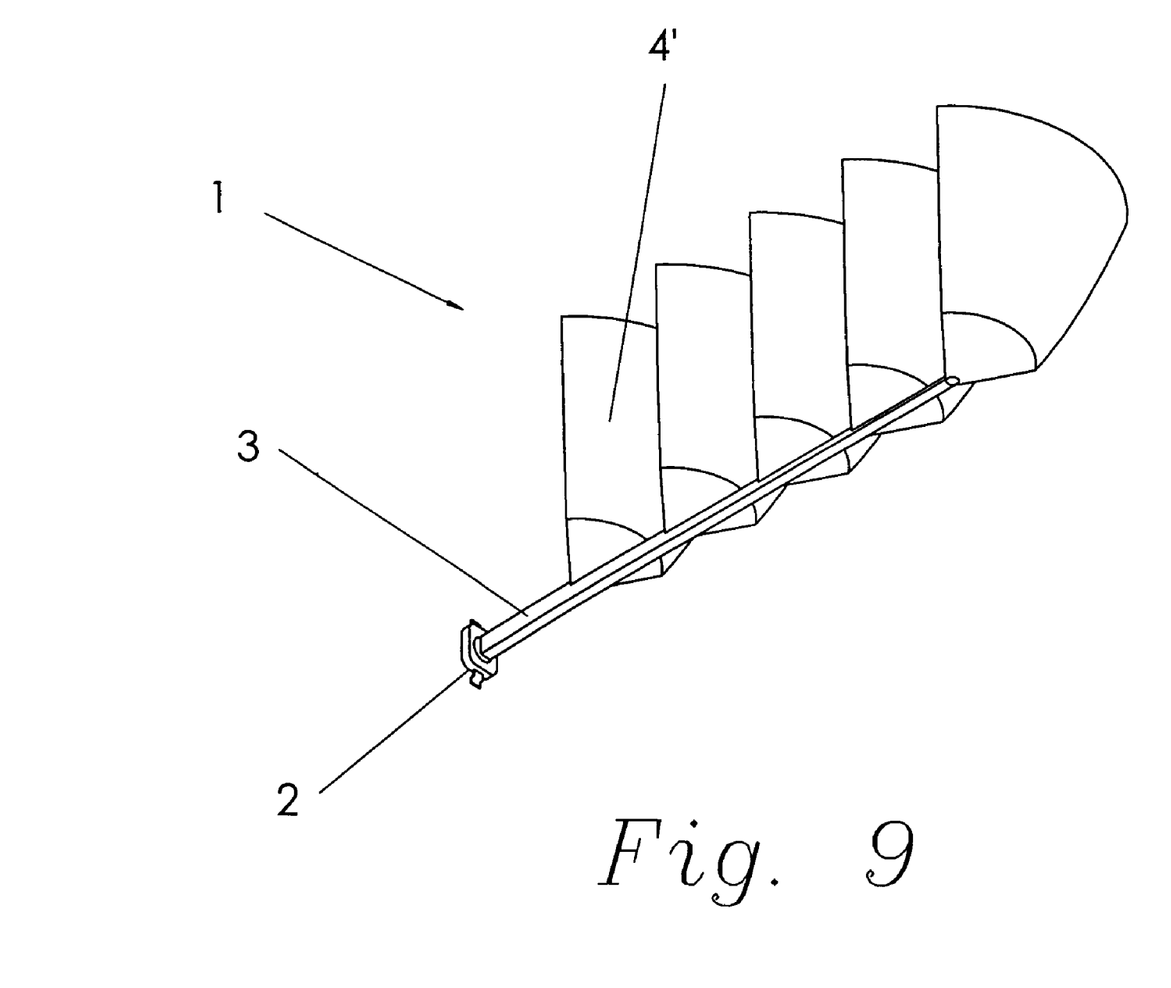
FIG. 9 shows a light pipe system utilizing three dimensional reflectors.
Figure 10:
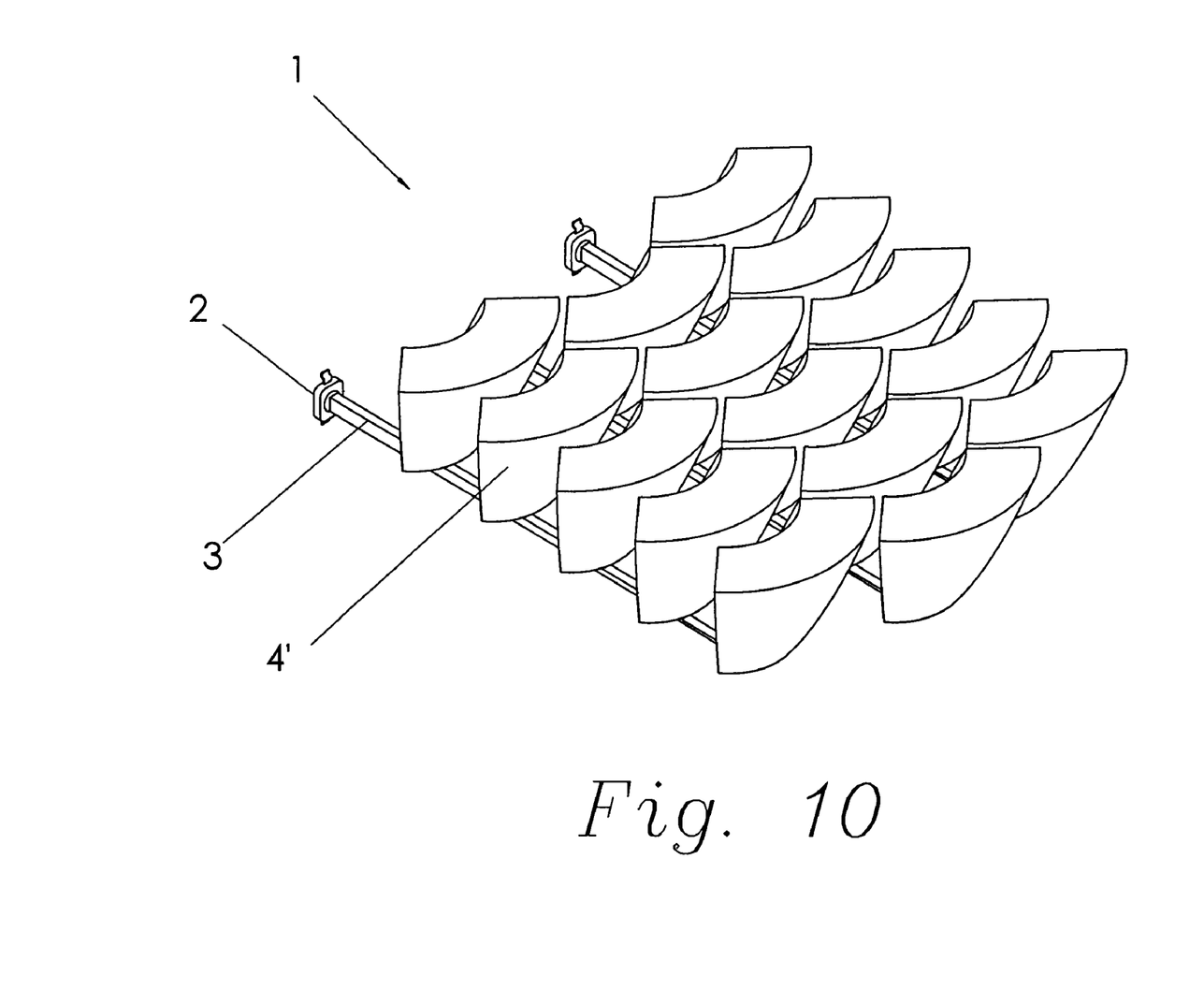
FIG. 10 illustrates a light pipe system utilizing an array of three dimensional reflectors.

FIG. 9 shows the optical system 1 constructed with 3D reflectors 4'. FIG. 10 illustrates an array of 3D reflectors 4' used in the system 1. The 3D reflectors 4' control the output of the system 1 in two dimensions, as opposed to the 2D reflectors 4, which control the direction of output light in only one dimension.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An optical system comprising:
a light source;
a light pipe along which light from the light source travels by total internal reflection; and
a light extracting and reflecting member comprising a light extractor in contact with the light pipe to provide selective extraction of light from the light pipe, and a reflector positioned outside the light pipe, the reflector configured to direct light extracted from the light pipe by the light extractor away from the light pipe.

2. The optical system of claim 1, wherein the light pipe has a reduction in thickness from a first end at which the light source is located, the reduction in thickness being accomplished by a notch that receives the light extracting and reflecting member.

3. The optical system of claim 1, wherein the light pipe has a tapered reduction in thickness from a first end at which the light source is located.

4. The optical system of claim 1, wherein the reflector controls the direction of output light in one dimension.

5. The optical system of claim 1, wherein the reflector controls the direction of output light in two dimensions.

6. The optical system of claim 1, wherein the light extracting and reflecting member is one of multiple light extracting and reflecting members disposed along the light pipe.

7. The optical system of claim 1, wherein the light source is one of multiple light sources employed to provide light to the light pipe.

8. An optical system comprising:
a light source comprising a plurality of LEDs;
a light pipe along which light from the light source travels by total internal reflection; and
a light extracting and reflecting member comprising a light extractor in contact with the light pipe to provide selective extraction of light from the light pipe, and a reflector positioned outside the light pipe, the reflector configured to direct light extracted from the light pipe by the light extractor away from the light pipe.

9. The optical system of claim 8, wherein the light pipe has a reduction in thickness from a first end at which the light source is located, the reduction in thickness being accomplished by a notch that receives the light extracting and reflecting member.

10. The optical system of claim 8, wherein the light pipe has a tapered reduction in thickness from a first end at which the light source is located.

11. The optical system of claim 8, wherein the reflector controls the direction of output light in one dimension.

12. The optical system of claim 8, wherein the reflector controls the direction of output light in two dimensions.

13. The optical system of claim 8, wherein the light extracting and reflecting member is one of multiple light extracting and reflecting members disposed along the light pipe.

14. The optical system of claim 1, wherein the light pipe comprises a notch and the light extractor of the light extracting and reflecting member is in contact with the light pipe at the notch.

15. The optical system of claim 1, wherein the light pipe is one of an array of light pipes arranged in a plane, and the light extracting and reflecting member is one of an array of light extracting and reflecting members arranged non-parallel to the light pipes, each of the light extracting and reflecting members comprising a respective light extractor in contact with each of the light pipes to selectively extract light from the light pipes.

16. The optical system of claim 8, wherein the light pipe comprises a notch and the light extractor of the light extracting and reflecting member is in contact with the light pipe at the notch.

17. The optical system of claim 8, wherein the light pipe is one of an array of light pipes arranged in a plane, and the light extracting and reflecting member is one of an array of light extracting and reflecting members arranged non-parallel to the light pipes, each of the light extracting and reflecting members comprising a respective light extractor in contact with each of the light pipes to selectively extract light from the light pipes.

18. An optical system, comprising:
- an array of light pipes arranged in a plane, each of the light pipes comprising a light input surface at an end thereof, and a side surface comprising steps disposed along a length thereof such that the light pipe decreases in thickness with increasing distance from the light input surface;
- a respective light source adjacent the light input surface of each of the light pipes; and
- an array of light extracting and reflecting members arranged non-parallel to the light pipes, each of the light extracting and reflecting members comprising:
  - a light extractor in contact with a respective step of the light pipes to selectively extract light from the light pipes, and
  - a reflector to direct light extracted from the light pipes by the light extractor away from the light pipes.

* * * * *